Jan. 24, 1967   N. O. ROSAEN   3,300,662
POWER TRANSFER CIRCUIT
Filed Dec. 30, 1963

INVENTOR.
NILS O. ROSAEN

United States Patent Office 3,300,662
Patented Jan. 24, 1967

3,300,662
POWER TRANSFER CIRCUIT
Nils O. Rosaen, Bloomfield Hills, Mich.
(1776 E. 9 Mile Road, Hazel Park, Mich. 48030)
Filed Dec. 30, 1963, Ser. No. 334,470
17 Claims. (Cl. 310—12)

The present invention relates to electric current generators and more particularly to a new and simplified power transfer circuit system effecting generation of alternating current.

Conventional generating devices for converting mechanical energy into electrical energy have the disadvantage that they require moving elements such as commutators and the like which are apt to produce undesirable current fluctuations and are subject to wear and damage.

Copending applications bearing Ser. No. 108,547 and filed by me on May 8, 1961, now Patent No. 3,163,785, and Serial No. 334,471 filed by me on Dec. 30, 1963, disclose and claim new simplified current generators comprising a fluid carrying magnetic particles past conductors. Means in the form of permanent magnets are provided to align the magnetic particles as they flow past the conductors to thereby induce an electrical current flow within the conductors.

While the power transfer circuits disclosed in my aforementioned copending applications have proven quite satisfactory, it is apparent that because the relative movement of the magnetic particles and the conductors is essentially in one direction only, the current produced thereby is necessarily direct current. There are many situations in which it is desirable to use alternating current as the source of power.

The present invention provides a power transfer circuit which is capable of producing either a direct current or an alternating current as desired.

It is an object then of the present invention to provide a simplified alternating current generator by providing a fluid provided with magnetic particles and flowing past a conductor to induce current flow and means operable to rotate the poles of the magnetic particles on axes substantially parallel to the axis of the conductor.

It is another object of the present invention to provide a permanent magnet commutatorless generator selectively operable to produce direct current or alternating current having a wide range of frequency by moving a magnetic substance through a magnetic field to molecularly align the magnetic particles, arranging a conductor for the induction of current, and providing a selectively and variably operable means for moving the poles of the magnetic particles about axes substantially parallel to the axis of the conductor to reverse the poles of the magnetic field.

Figure 1:
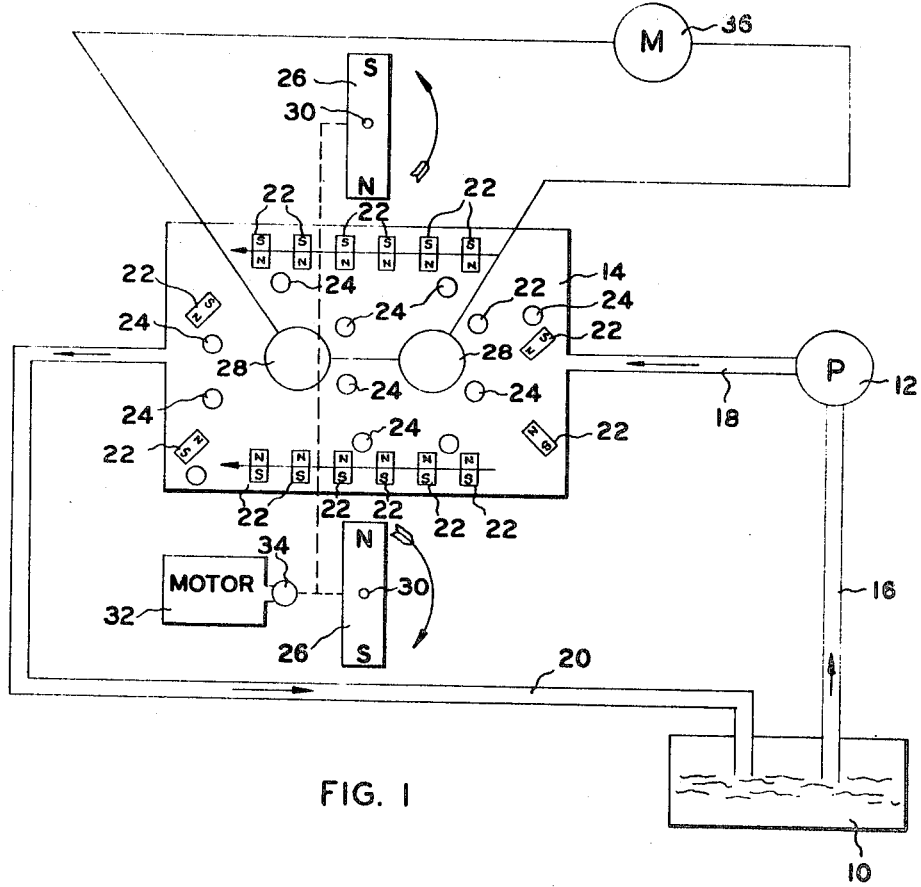
Figure 2:
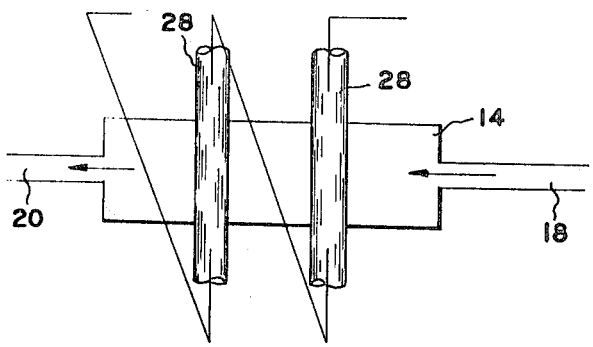

Still further objects and advantages will readily occur to one skilled in the art to which the invention pertains upon reference to the following drawings in which like reference characters refer to like parts throughout the several views and in which FIG. 1 illustrates diagrammatically a preferred generating system of the present invention, and FIG. 2 is a fragmentary diagrammatic cross sectional view of the generating chamber illustrated in FIG. 1.

As illustrated, the system of the present invention preferably comprises a fluid reservoir 10, a pump 12, a generating chamber 14, and fluid conducting conduits 16, 18, and 20 to provide fluid flow in the direction indicated by the arrows.

The fluid itself comprises a heterogeneous mixture of magnetic particles 22 and diamagnetic particles 24, indicated diagrammatically respectively as elongated bodies and round bodies inside the chamber 14 carried in a fluid medium to give mobility.

The term "magnetic particles" is intended for purposes of this disclosure to mean particles of a substance which has the characteristic that they become polarized in the presence of a magnetic field and are attracted to the source of the magnetic field. By the term "diamagnetic particles" it is meant particles of a substance which has the characteristic of being repelled by the source of a magnetic field.

The magnetic particles 22 may be of that group of metals including iron or such iron alloys as $Fe_2CO$, preferably very finely powdered and having a density of about 6 to 8 at 20° C. The diamagnetic particles 24 may be of that group of metals including bismuth, also finely powdered and preferably having a greater density than the magnetic particles 22. Bismuth's density, for example, is about 9.8 at 20° C.

The fluid medium or carrier may be diethylene glycol, ethylene glycol or a mixture of the two with a suitable corrosion inhibitor and distilled water if needed so that the fluid medium has the characteristics that it is not affected by extremes of temperaure, protects against rust and corrosion and will not affect the stability of the two carried elements. Yet such a carrier will provide the composite with fluidity enabling it to be poured, so that it will flow readily and be capable of being pumped through the fluid circuit.

Permanent magnets 26 are disposed adjacent opposite sides of the chamber 14 to provide magnetic fields within the chamber 14 through which the fluid passes. With the magnets 26 in the position illustrated and with like poles directed toward each other, the magnetic particles 22 will become magnetized and each will become a magnet with the poles oriented as indicated diagrammatically in FIG. 1.

Conductors 28 shown diagrammatically as rods, extend through the chamber 14 and are disposed normal to the direction of fluid flow therethrough. The magnets 26 are rotatably carried on axes 30 positioned intermediate the poles and also substantially normal to the direction of flow through the chamber 14 and are operably connected to a motor 32. The motor 32 rotates the magnets 26 about the axes 30 preferably in opposite directions as shown by the arrows so that the poles of the magnets 26 which are presented to the sides of the chamber 14 are changed in a regular cycle. The motor 32 is preferably provided with a variable speed control 34 so that the speed of rotation of the magnets 26 can be selectively varied.

As illustrated in FIG. 2, the conductors 28 are connected in series and with like windings projecting through the chamber 14. Any electricity using device such as a motor 36 is connected with the conductors 28.

With the system in the position illustrated in FIG. 1 and with the motor 32 not operating so that the position of the magnets 26 is fixed, the magnetic particles 22 will become magnetized and will be oriented as illustrated diagrammatically with the poles of the magnets 26 adjacent the chamber 14 attracting opposite poles of the magnetic particles 22. The tendency of the magnetic particles 22 to be attracted to the sides of the chamber 14, by the magnets 26 wil be effectively counteracted by the tendency of the denser diamagnetic particles 24 to move away from the magnets 26.

As the fluid is pumped then through the chamber 14, the lines of force produced by the magnetized particles 22 will be cut by the conductors 28 to induce a current flow through the conductors 28. The magnitude of this current will depend upon the strength of the magnetic fields produced by the magnetic particles 22 and the magnets 26 as well as the rate at which the fluid is pumped through the chamber 14. Since the magnetic particles 22 are oriented so that the lines of force cut by the conductors 28 as the fluid moves past are those adjacent the like pole of the particles and the fluid is moving through the chamber in one direction, the current produced thereby will be direct current of a magnitude depending on the rate of fluid flow through the chamber 14.

Operation of the motor 32 produces a rotation of the magnets 26 about the axes 30 to produce a cycle alternatively and regularly presenting each pole of the magnets 26 adjacent the chamber 14. This produces a corresponding rotation of the magnetic particles 22 so that as the fluid moves past the conductors 28 those lines of force produced by the magnetized particles 22 which are alternately adjacent the north pole and then the south pole of the particles 22 are cut. The effect produced is essentially as though the magnetized particles 22 were fixed and the conductors 28 were moved back and forth through the magnetic field produced thereby so that the current induced in the conductors becomes an alternating current. The frequency of the current will depend upon the rate of rotation of the magnets 26 so that by varying the speed of the motor 32 it is possible to vary the frequency of the alternating current induced in the conductors 28.

It is preferred to rotate the magnets 26 in opposite directions as shown to offset any tendency of the particles 22 to produce eddies of fluid within the chamber 14.

It is apparent that although means have been described for inducing a substantially constant direct current as well as an alternating current in the conductors 28, it is also possible with very little modification to induce a pulsating direct current in the conductors 28. By providing means for oscillating the magnets 26 through a 180° arc, such a current would be produced.

Although I have described but one embodiment of the present invention and although it has been shown diagrammatically only, it is apparent that many changes and modifications can be made without departing from the spirit of the invention or the scope of the appended claims.

I claim:
1. An induction circuit comprising
   (a) a source operable to produce a magnetic field,
   (b) a fluid and means moving said fluid through said magnetic field,
   (c) said fluid including first particles carried therein and having the property of being polarized in said magnetic field and being attracted to said magnetic field producing source,
   (d) second particles carried in said fluid having the property of being repelled from said magnetic field producing source,
   (e) said magnetic field producing source being arranged and operable to effect molecular alignment in said first particles whereby said fluid becomes in effect a magnetic field in motion,
   (f) a conductor extending through said fluid whereby movement of said fluid induces electric current flow in said conductor, and
   (g) means selectively operable to reverse the polarity of said magnetic field source.

2. The circuit as defined in claim 1 and in which said conductor extends normal to the direction of movement of said fluid.

3. A current generating device comprising
   (a) a housing having a fluid chamber,
   (b) fluid in said chamber,
   (c) means effecting unidirectional motion of said fluid in said chamber,
   (d) said fluid having magnetic particles therein,
   (e) means effecting molecular magnetic alignment of said particles to produce a magnetic field about each of said particles,
   (f) a conductor disposed in said chamber and extending normal to the direction of movement of said fluid whereby electric current flow is induced in said conductor, and
   (g) said particle alignment effecting means including means selectively operable to reverse the polarity of said particles.

4. The current generating device as defined in claim 3 and in which said particle alignment effecting means further comprises permanent magnets disposed on opposite sides of said chamber and arranged with like poles directed toward each other and said last mentioned means comprises means for pivoting said magnets about axes disposed respectively intermediate the poles of said magnets.

5. The device as defined in claim 3 and in which said fluid has diamagnetic particles therein of greater density than said magnetic particles to impede a tendency to lateral movement by attraction of said magnets for said first mentioned particles.

6. The current generating device as defined in claim 3 and in which said particle alignment effecting means further comprises a permanent magnet disposed closely adjacent said chamber and said last mentioned means comprises means pivoting said magnet about an axis intermediate the poles of said magnet.

7. A current generator device comprising
   (a) a housing having a fluid chamber,
   (b) a fluid in said chamber,
   (c) means effecting movement of said fluid through said chamber,
   (d) said fluid having magnetic particles therein,
   (e) means effecting molecular magnetic alignment of said particles,
   (f) a conductor disposed in said chamber and extending substantially normal to the direction of movement of said fluid whereby electric current flow is induced in said conductor,
   (g) said effecting means including means selectively operable to reverse the position of the poles of said particles.

8. An induction circuit comprising
   (a) a source operable to produce a magnetic field,
   (b) a fluid and means moving said fluid through said magnetic field,
   (c) said fluid including particles carried therein and having the property of being polarized in said magnetic field and being attracted to said magnetic field producing source,
   (d) said magnetic field producing source being arranged and operable to effect molecular alignment in said particles whereby said fluid becomes in effect a magnetic field in motion,
   (e) a conductor extending through said fluid whereby movement of said fluid induces electric current flow in said conductor, and
   (f) means selectively operable to pivot the poles of said magnetic field producing source about an axis intermediate said poles whereby to change the direction and polarity of the lines of force produced by said magnetic field producing source with respect to the position of said conductor.

9. The circuit as defined in claim 8 and in which said conductor extends normal to the direction of movement of said fluid.

10. A current generating device comprising
    (a) a housing having a fluid chamber,
    (b) fluid in said chamber,
    (c) means effecting unidirectional motion of said fluid in said chamber,
    (d) said fluid having magnetic particles therein,
    (e) means effecting molecular magnetic alignment of said particles to produce a magnetic field about each of said particles,
    (f) a conductor disposed in said chamber and extending normal to the direction of movement of said fluid whereby electric current flow is induced in said conductor, (g) said particle alignment effecting means comprising a permanent magnet disposed closely adjacent said chamber, and (h) means pivoting said magnet on an axis intermediate the poles of said magnet and substantially parallel to said conductor.

11. The device as defined in claim 10 and in which said last mentioned means is operable to oscillate said magnet on said axis through an arc of substantially 180°.

12. The device as defined in claim 10 and in which said last mentioned means is operable to rotate said magnet about said axis.

13. A current generating device comprising
(a) a housing having a fluid chamber,
(b) fluid in said chamber,
(c) means effecting unidirectional motion of said fluid in said chamber,
(d) said fluid having magnetic particles therein,
(e) means effecting molecular magnetic alignment of said particles to produce a magnetic field about each of said particles,
(f) a conductor disposed in said chamber and extending normal to the direction of movement of said fluid whereby electric current flow is induced in said conductor,
(g) said particle alignment effecting means comprising permanent magnets disposed on opposite sides of said chamber and arranged with like poles directed toward each other, and (h) means pivoting said magnets together on axes disposed respectively intermediate the poles of said magnets and substantially parallel to said conductor.

14. The device as defined in claim 13 and in which said last mentioned means is operable to oscillate said magnets on said axes through an arc of substantially 180°.

15. The device as defined in claim 14 and in which said last mentioned means is operable to oscillate said magnets in opposite directions.

16. The device as defined in claim 13 and in which said last mentioned means is operable to rotate said magnets about said axes.

17. The device as defined in claim 13 and in which said last mentioned means is operable to rotate said magnets about said axes in opposite directions.

References Cited by the Applicant

UNITED STATES PATENTS

| | | |
|---|---|---|
| 2,787,354 | 4/1957 | Gill. |
| 2,988,000 | 6/1961 | Blake. |

FOREIGN PATENTS

| | | |
|---|---|---|
| 17,936 | 1908 | Great Britain. |

MILTON O. HIRSHFIELD, *Primary Examiner.*

D. X. SLINEY, *Assistant Examiner.*